(12) United States Patent
Inoue et al.

(10) Patent No.: US 10,965,853 B2
(45) Date of Patent: Mar. 30, 2021

(54) CONTROL APPARATUS, ACCESSORY, IMAGING APPARATUS, AND IMAGING SYSTEM CAPABLE OF SWITCHING LIGHT EMISSION MODES FOR IMAGING

(71) Applicant: CANON KABUSHIKI KAISHA, Tokyo (JP)

(72) Inventors: Chiaki Inoue, Utsunomiya (JP); Yuichi Kusumi, Shimotsuke (JP); Yoshiaki Ida, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/449,535

(22) Filed: Jun. 24, 2019

(65) Prior Publication Data

US 2020/0014828 A1    Jan. 9, 2020

(30) Foreign Application Priority Data

Jul. 6, 2018    (JP) .............................. JP2018-129102

(51) Int. Cl.
*H04N 5/225* (2006.01)
*G03B 17/56* (2021.01)
*H04N 5/232* (2006.01)

(52) U.S. Cl.
CPC ......... *H04N 5/2256* (2013.01); *G03B 17/565* (2013.01); *H04N 5/2254* (2013.01); *H04N 5/23229* (2013.01)

(58) Field of Classification Search
CPC ............... H04N 5/2256; H04N 5/2254; H04N 5/23229; H04N 5/232; H04N 5/23245;
(Continued)

(56) References Cited

U.S. PATENT DOCUMENTS 5,065,232 A * 11/1991 Kondo ................... H04N 9/735
348/224.1
2002/0148947 A1 * 10/2002 Kakiuchi ............... G03B 15/03
250/208.1

(Continued)

FOREIGN PATENT DOCUMENTS

JP    2010114600 A    5/2010
JP    2010122158 A    6/2010

*Primary Examiner* — Gevell V Selby
(74) *Attorney, Agent, or Firm* — Rossi, Kimms & McDowell LLP

(57) ABSTRACT

A control apparatus includes a controller configured to switch a simultaneous light emission mode that causes all of the at least three light source units to emit lights and a sequential light emission mode that causes the at least three light source units to sequentially emit the lights in association with imaging. The controller causes the at least three light source units to sequentially emit the lights in synchronization with each of at least three imaging signals transmitted from the imaging apparatus in the sequential light emission mode. The controller is configured to switch between the simultaneous light emission mode and the sequential light emission mode based on information from a selector provided in at least one of the imaging apparatus and the accessory and configured to select the simultaneous light emission mode and the sequential light emission mode.

13 Claims, 7 Drawing Sheets

(58) Field of Classification Search
CPC ...... H04N 5/2354; G03B 17/565; G03B 7/17; G03B 2215/0539; G03B 15/05
See application file for complete search history.

(56) References Cited

U.S. PATENT DOCUMENTS

| | | | | |
|---|---|---|---|---|
| 2005/0225980 | A1* | 10/2005 | Amphlett | G03B 15/03 362/244 |
| 2009/0034958 | A1* | 2/2009 | Dierenbach | G03B 15/03 396/199 |
| 2015/0227024 | A1* | 8/2015 | Miyakawa | F21V 33/0052 362/9 |

* cited by examiner

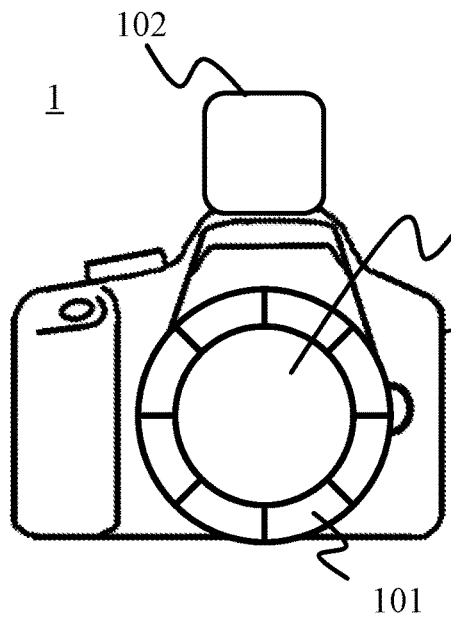
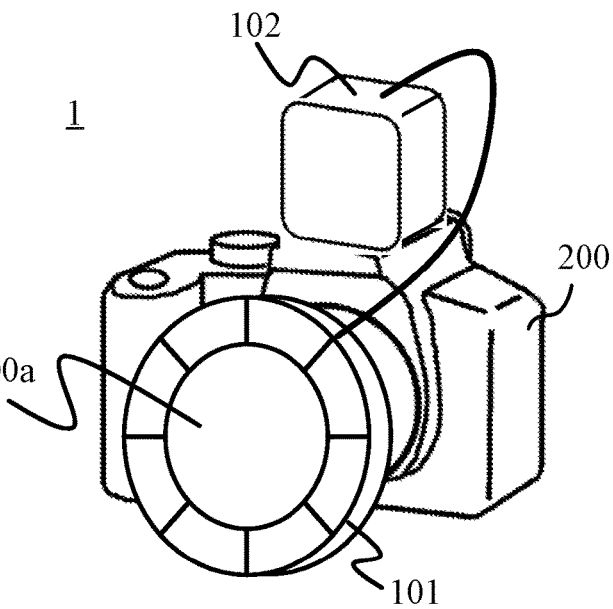
FIG. 1A
FIG. 1B
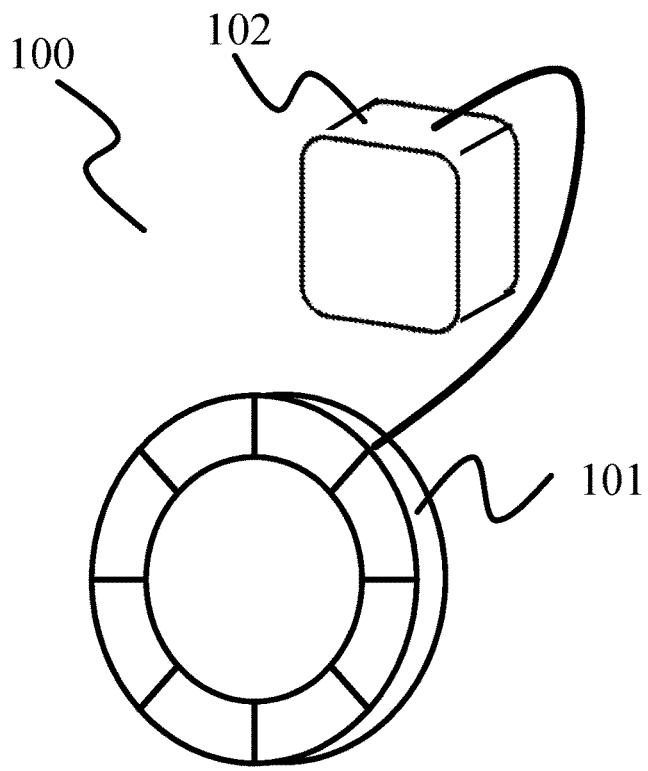
FIG. 2

CONTROL APPARATUS, ACCESSORY, IMAGING APPARATUS, AND IMAGING SYSTEM CAPABLE OF SWITCHING LIGHT EMISSION MODES FOR IMAGING

BACKGROUND OF THE INVENTION

Field of the Invention

The present invention relates to a control apparatus, an accessory, an imaging apparatus, and an imaging system.

Description of the Related Art

The multi-lamp strobe photography (or imaging) has conventionally been known in which a plurality of strobe apparatuses are arranged around an object and the object is imaged in synchronization with the light emission of the strobe apparatus. In the multi-lamp strobe photography, the user can freely control a shadow of the object by adjusting the arrangement and the light intensities of the strobe apparatuses, but is required to have a high skill and experience in order to obtain an intended effect. One technique for supplementing a lack in experience of the user, Japanese Patent Application Laid-Open No. ("JP") 2010-114600 discloses a camera system that enables the effect of the multi-lamp strobe photography to be confirmed prior to main imaging. The camera system disclosed in JP 2010-114600 stores a plurality of images acquired by individually emitting lights (light fluxes) from a plurality of strobe apparatuses and an image acquired by emitting none of them. Then, the camera system can output an image corresponding to the simultaneous light emissions with arbitrary light amounts by correcting the luminance values of the plurality of stored images and combining these images.

Image processing following imaging can generate an image based on a physical model by acquiring more physical information on the object. For example, a rendered image can be generated which reproduces a perspective or viewpoint of the object when the position and size of the light source as well as the light amount of the light source are changed. The perspective (view or appearance) of the object is determined by shape information of the object, reflectance information of the object, light source information, and the like. Since a physical behavior of light emitted from the light source and reflected by the object depends on a local surface normal, using the surface normal of the object rather than a three-dimensional shape for the shape information is especially effective. One known method of acquiring the surface normal of the subject, for example, is a method of converting a three-dimensional shape calculated from distance information acquired by a method, such as the triangulation using a laser beam and the binocular stereo, into surface normal information. However, such a method complicates the apparatus and the accuracy of the acquired surface normal is insufficient.

Accordingly, JP 2010-122158 discloses a photometric stereo method as a method of directly acquiring the surface normal of the object. The photometric stereo method assumes a reflection characteristic of the object based on the surface normal of the object and the direction from the object to the light source, and calculates the surface normal based on the object luminance information at a plurality of light source positions and the assumed reflection characteristic. The reflection characteristic of the object can be approximated, for example, using the Lambert reflection model according to the Lambert's cosine law.

In acquiring the surface normal of the object by the photometric stereo method, an imaging apparatus, such as a digital camera, needs to irradiate the object with lights from a plurality of known light sources located at mutually different positions. However, it is difficult for the camera system disclosed in JP 2010-114600 to accurately obtain the positional information of the plurality of strobe apparatuses, and thus to apply the photometric stereo method. In addition, even the strobe apparatus compatible with the photometric stereo method in the imaging apparatus, such as the digital camera, is demanded to provide the normal strobe photography in the camera in addition to the photometric stereo method. JP 2010-122158 discloses only the method of individually emitting each light source for the photometric stereo method. In other words, JP 2010-122158 is silent about a combination of the normal strobe photography that requires a large light emission amount and the photometric stereo photography that requires a plurality of images to be captured at different light source positions.

SUMMARY OF THE INVENTION

The present invention provides a control apparatus, an accessory, an imaging apparatus, and an imaging system, each of which can achieve both a normal flash photography that requires a large light emission amount and a photometric stereo photography that requires a plurality of images to be captured at different light source positions.

A control apparatus according to one aspect of the present invention includes a controller configured to control a light emission of at least three light source units having different light emission positions provided in an accessory that is configured to communicate with an imaging apparatus. The controller switches a simultaneous light emission mode that causes all of the at least three light source units to emit lights and a sequential light emission mode that causes the at least three light source units to sequentially emit the lights in association with imaging. The controller causes the at least three light source units to sequentially emit the lights in synchronization with each of at least three imaging signals transmitted from the imaging apparatus in the sequential light emission mode. The controller is configured to switch between the simultaneous light emission mode and the sequential light emission mode based on information from a selector provided in at least one of the imaging apparatus and the accessory and configured to select the simultaneous light emission mode and the sequential light emission mode. At least one processor or circuit is configured to perform a function of the controller.

An accessory having the controller and an imaging apparatus having the controller also constitute another aspect of the present invention.

Further features of the present invention will become apparent from the following description of exemplary embodiments with reference to the attached drawings.

BRIEF DESCRIPTION OF THE DRAWINGS

FIGS. 1A and 1B are overviews of an imaging system according to a first embodiment.

FIG. 2 is an overview of an illumination apparatus according to the first embodiment.

DESCRIPTION OF THE EMBODIMENTS

Figure 3:
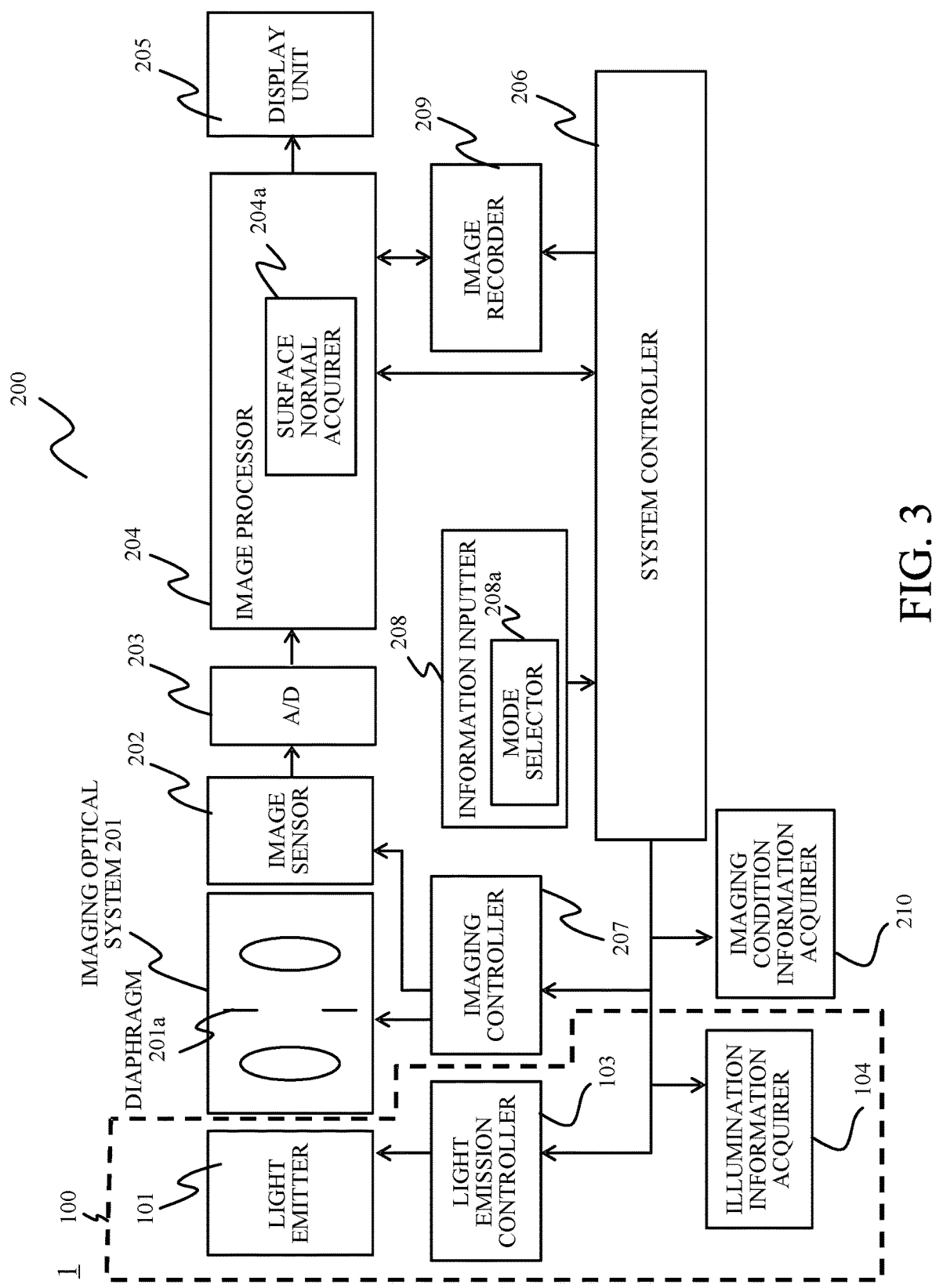
FIG. 3 is a block diagram of an imaging system according to the first embodiment.

Referring now to the accompanying drawings, a description will be given of embodiments according to the present invention. Corresponding elements in these figures will be designated by the same reference numerals, and a description thereof will be omitted.

Figure 8:
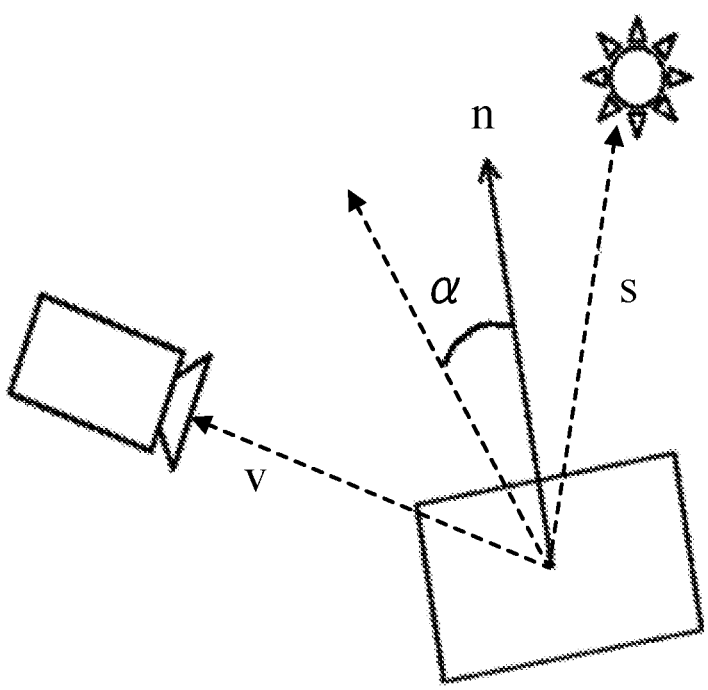
FIG. 8 explains a Torrance-Sparrow model.

The photometric stereo method is a method that assumes the reflection characteristic of the object based on the surface normal of the object and the direction from the object to the light source, and calculates the surface normal based on the reflection characteristic assumed as the object luminance information at a plurality of light source positions. When the reflectance cannot be uniquely determined given a predetermined surface normal and a light source position, the reflection characteristic can be approximated by the Lambert reflection model according to the Lambert's cosine law. As illustrated in FIG. 8, the specular reflection component depends on an angle α between a bisector of the light source vector s and the visual line direction vector v, and the surface normal n. Thus, the reflection characteristic may be based on the visual line direction. The luminance information may be obtained by capturing objects where the light source is turned on and where it is turned off, and by calculating a difference between them so as to remove the influence of the non-light source such as ambient light.

A description will now be given of the reflection characteristic assumed in the Lambert reflection model. Where "i" is a luminance value of the reflected light, "pa" is a Lambert diffuse reflectance of the object, "E" is an intensity of the incident light, "s" is a unit vector (light source direction vector) indicating the direction (light source direction) from the object to the light source, and "n" is a unit surface normal vector of the object, then the luminance value i is expressed by the following expression (1) from the Lambert's cosine law.

$$i = E\rho_d s \cdot n \quad (1)$$

Where s1, s2, . . . , $S_M$ are components of M (M≥3) different light source vectors and $i_1, i_2, \ldots, i_M$ are luminance values of the components of the light source vector, the expression (1) is expressed by the following expression (2).

$$\begin{bmatrix} i_1 \\ \vdots \\ i_M \end{bmatrix} = \begin{bmatrix} s_1^T \\ \vdots \\ s_M^T \end{bmatrix} E\rho_d n \quad (2)$$

In the expression (2), the left side is a luminance vector of M rows and 1 column, the right side $[s_1^T, \ldots s_M^T]$ is an incident light matrix S indicating the light source direction of M rows and 3 columns, n is a unit surface normal vector of 3 rows and 1 column. In case of M=3, $E\rho_d n$ is expressed by the following expression (3) using an inverse matrix $S^{-1}$ of the incident light matrix S.

$$E\rho_d n = S^{-1} \begin{bmatrix} i_1 \\ \vdots \\ i_M \end{bmatrix} \quad (3)$$

A norm of the vector on the left side of the expression (3) is a product of the intensity E of the incident light and the Lambert diffuse reflectance $\rho_d$, and the normalized vector is calculated as the surface normal vector of the object. In other words, since the intensity E of the incident light and the Lambert diffuse reflectance $\rho_d$ appear in the conditional expression in the form of the product and thus, where $E\rho_d$ is one variable, the expression (3) is regarded a simultaneous equation that determines three unknown variables including two degrees of freedom of the unit surface normal vector n. Therefore, the luminance information acquired with at least three light sources can determine each variable. When the incident light matrix S is not a regular matrix, there is no inverse matrix and it is thus necessary to select each component $s_1$ to $s_3$ in the incident light matrix S so that the incident light matrix S can be a regular matrix. In other words, the component $s_3$ may be selected linearly and independently of the components $s_1$ and $s_2$.

In case of M>3, there are conditional expressions more than the number of unknown variables to be calculated. The unit surface normal vector n may be calculated from three arbitrarily selected conditional expressions by the same method as that with M=3. When four or more conditional expressions are used, the incident light matrix S does not become a regular matrix and, for example, an approximate solution may be calculated using a Moore-Penrose pseudo inverse matrix. The unit surface normal vector n may also be calculated by a fitting method or optimization method.

When the reflection characteristic of the object is assumed by a model different from the Lambert reflection model, the conditional expression may be different from the linear equation for each component in the unit surface normal vector n. In this case, the fitting method and optimization method can be used once conditional expressions more than the number of unknown variables are obtained.

In addition, in case of M>3, a plurality of (from 3 to M−1 inclusive) conditional expressions can be obtained and a plurality of solution candidates of the unit surface normal vector n can be calculated. In this case, a solution may be selected from the plurality of solution candidates using still another condition. For example, the continuity of the unit surface normal vector n can be used as the condition. Where the unit surface normal n is calculated for each pixel of the imaging apparatus and n(x−1, y) is known with the surface normal n(x, y) at pixel (x, y), a solution that minimizes the evaluation function expressed by the following expression (4) may be selected.

$$1 - n(x,y) \cdot n(x-1,y) \quad (4)$$

If n(x+1, y) and n(x, y±1) are also known, the solution that minimizes the following term (5) may be selected.

$$4 - n(x,y) \cdot n(x-1,y) - n(x,y) \cdot n(x+1,y) - n(x,y) \cdot n(x,y-1) - n(x,y) \cdot n(x,y+1) \quad (5)$$

Where there is no known surface normal and there is ambiguity of the surface normal at all pixel positions, the solution may be selected so that the sum total of all pixels of the term (5) becomes minimum, as illustrated in the following expression (6).

$$\sum_{x,y} \{4 - n(x, y) \cdot n(x-1, y) - n(x, y) \cdot n(x+1, y) - \qquad (6)$$

$$n(x, y) \cdot n(x, y-1) - n(x, y) \cdot n(x, y+1)\}$$

A surface normal at a non-closest pixel or an evaluation function weighted according to a distance from an addressed pixel position may also be used.

The luminance information at an arbitrary light source position may be used for another condition. In the diffuse reflection model represented by the Lambert reflection model, the closer the unit surface normal vector and the light source direction vector are, the greater the luminance of the reflected light becomes. Thus, the unit surface normal vector can be determined by selecting a solution close to the light source direction vector in which the luminance value becomes the largest among the luminance values in the plurality of light source directions.

In the specular reflection model, the following expression (7) is established where s is the light source vector and v is the unit vector in the direction from the object to the camera (visual line vector of the camera).

$$s+v=2(v \cdot n)n \qquad (7)$$

As expressed by the expression (7), if the light source direction vector s and the visual line vector v of the camera are known, the unit surface normal vector n can be calculated. With the surface roughness, the specular reflection also has a spreading exit angle. However, the angle spreads near the solution obtained as a smooth surface, and it is thus sufficient to select a candidate that is the closest to the solution to the smooth surface among the plurality of solution candidates. Alternatively, a true solution may be determined by averaging the plurality of solution candidates.

Once the surface normal n and the reflectance $\rho$ ($=E\rho_d$) are obtained by the above photometric stereo method, the luminance value i under an arbitrary light source can be calculated by providing an arbitrary light source vector s to the expression (1). In other words, a rendered image can be generated that reproduces the perspective under the arbitrary light source (the appearance of the object). In the expression (1), the rendered image with the Lambertian diffuse reflection is generated, but the rendered image may be generated with another diffuse reflection characteristic or the specular reflection characteristic in addition to it.

FIRST EMBODIMENT

FIGS. 1A and 1B are a front view and a perspective view of an imaging system 1 according to this embodiment. FIG. 2 is an overview of an illumination apparatus (accessory) 100 according to this embodiment. FIG. 3 is a block diagram of the imaging system 1.

The imaging system 1 includes the illumination apparatus 100 and an imaging apparatus 200 to which the illumination apparatus 100 is detachably attached. The illumination apparatus 100 includes a light emitter 101 and a connector (communicator) 102. The imaging apparatus 200 includes an imager 200a including an imaging optical system 201.

The light emitter 101 includes eight light source units concentrically arranged at equal intervals around the optical axis of the imaging optical system 201. The light emitters 101 integrated with the single illumination apparatus 100 can fix the relative position of each light source unit, and facilitates to obtain light source position information necessary for the photometric stereo method. The illumination apparatus 100 is connected by the connector 102 for an information communication with the imaging apparatus 200.

Since at least three light source units are required for the photometric stereo method, the light emitter 101 may include three or more light source units. The number of light source units may be four or more and eight or less for proper light irradiation onto the object, for an easy control, and for the cost reduction purposes for the photometric stereo photography. This embodiment arranges a plurality of light source units in the light emitter 101 concentrically at regular intervals around the optical axis in the imaging optical system 201, but the present invention is not limited to this embodiment. This embodiment physically attaches the light emitter 101 to the imaging apparatus 200, but may separate it from the imaging apparatus 200. In the separated configuration, the light emitter 101 may communicate with the imaging apparatus 200 by the wireless communication function.

The imaging optical system 201 includes a diaphragm 201a and focuses light from an object on an image sensor 202. The image sensor 202 includes a photoelectric conversion element, such as a CCD sensor and a CMOS sensor, and images an object. An analog electric signal generated by the photoelectric conversion of the image sensor 202 is converted into a digital signal by an A/D converter 203 and input to an image processor 204.

This embodiment installs the imaging optical system 201 in the imaging apparatus 200, but may be detachably attached to the imaging apparatus 200.

The image processor 204 acquires surface normal information of the object together with image processing generally performed for the digital signal. The image processor 204 includes a surface normal acquirer 204a that acquires the surface normal information. The output image processed by the image processor 204 is stored in an image recorder 209, such as a semiconductor memory or an optical disc. The output image may be displayed on a display unit 205. This embodiment installs the surface normal acquirer 204a in the imaging apparatus 200, but may separate it from the imaging apparatus 200.

An information inputter 208 supplies a system controller 206 with an imaging condition, such as an aperture value (F-number), an exposure time, and a focal length, selected by the user. A mode selector 208a supplies an imaging (light emission) mode, such as a simultaneous light emission mode (or full light emission mode), a sequential light emission mode, and another light emission mode, selected by the user to the system controller 206. In this embodiment, the user can select, as the light emission mode, either the simultaneous light emission mode meaning the normal strobe photography or the sequential light emission mode meaning the photometric stereo photography. An imaging controller 207 acquires an image under a desired imaging condition and a light emission mode selected by the user based on the information from the system controller 206. An imaging condition information acquirer 210 acquires information on the set imaging condition.

A light emission controller 103 controls a light emission state of the light emitter 101 in accordance with an instruction from the system controller 206. The illumination information acquirer 104 acquires information on the illumination apparatus, such as the number of light source units, the light emission amount of the light source unit, and the color temperature of the light source unit. The light emission amount of the light source unit may be an individual light emission amount of each light source unit, or may be a light emission amount obtained by combining all the light source units (or the light emission amount of the light emitter 101). This is similarly applied to the color temperature. The color temperature may be an individual color temperature of each light source unit, or may be a combined color temperature of all the light source units (or the color temperature of the light emitter 101). The information on the illumination apparatus may be information that causes the imaging apparatus 200 to identify the number of light source units, the light emission amount of the light source unit, the color temperature of the light source unit, and the like in the illumination apparatus 100. In other words, the information may be information directly indicating the parameters described above, or may be information unique to the illumination apparatus 100 such as a product ID. While this embodiment provides the light emission controller 103 in the illumination apparatus 100, the light emission controller 103 may be provided as a control apparatus different from the illumination apparatus 100. When the control apparatus different from the illumination apparatus 100 is provided to control the light emission mode of the illumination apparatus 100, the control apparatus is configured to communicate with the imaging apparatus 200 and the illumination apparatus 100.

Figure 4:
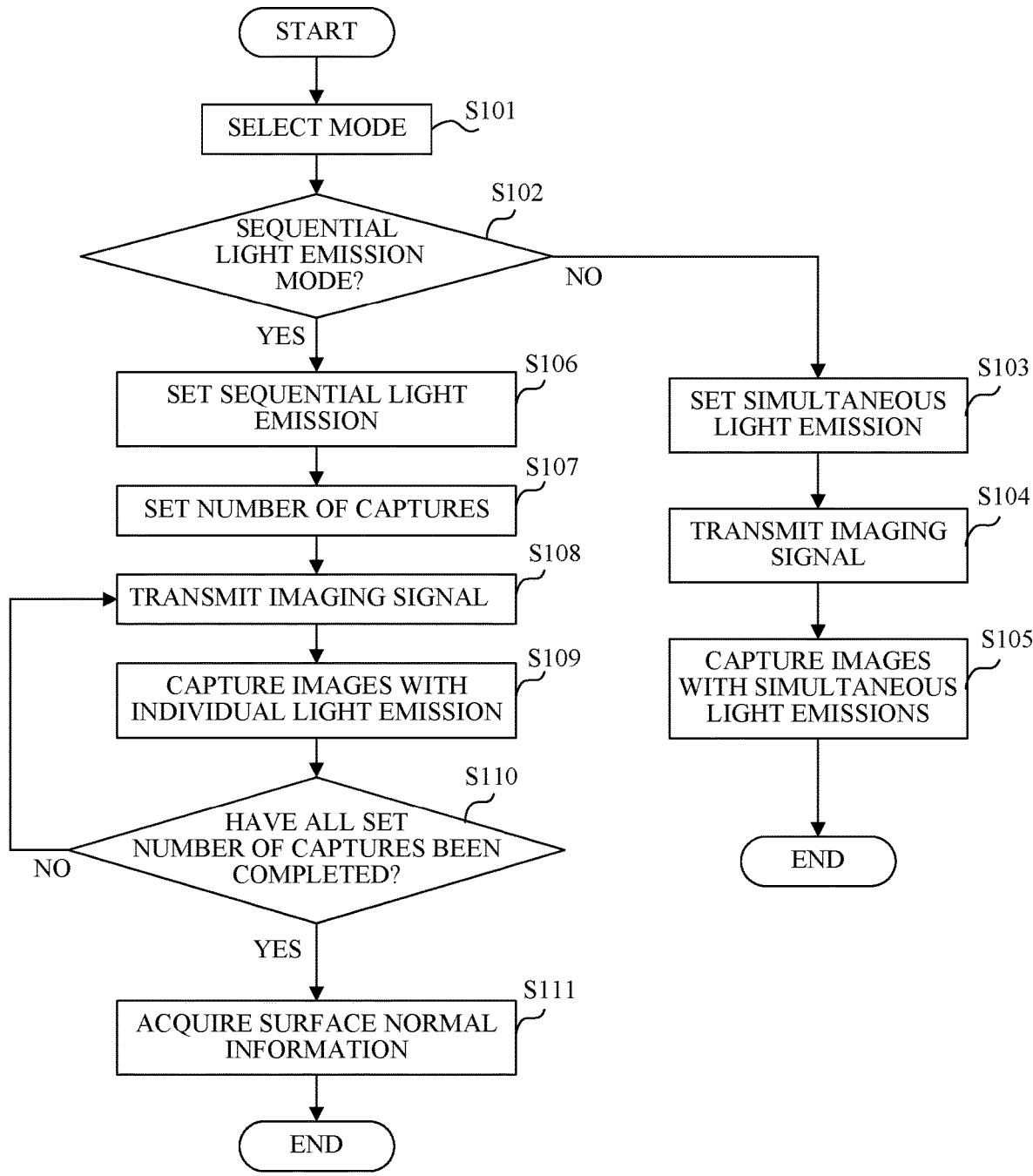
FIG. 4 is a flowchart of imaging processing according to the first embodiment.

FIG. 4 is a flowchart of the light emission control and imaging processing according to this embodiment. The processing in FIG. 4 is executed by the system controller 206 in accordance with a processing program as a computer program. The processing program may be recorded, for example, on a computer-readable storage medium.

In the step S101, the system controller 206 acquires the light emission mode selected by the user from the mode selector 208a. In this embodiment, the user can select, as the light emission mode, either the simultaneous (or full) light emission mode which means the normal strobe photography or the sequential light emission mode which means the photometric stereo photography, but the present invention is limited to this embodiment. In addition to these modes, another light emission mode may be selected which realizes another light emission state.

In the step S102, the system controller 206 determines the selected light emission mode. In this embodiment, the system controller 206 determines whether the selected light emission mode is the sequential light emission mode. If the light emission mode is the sequential light emission mode, the flow proceeds to the step S106, and if the light emission mode is not the sequential light emission mode or if the light emission mode is the simultaneous light emission mode, the flow proceeds to the step S103.

In the step S103, the system controller 206 transmits, to the light emission controller 103, information that the simultaneous light emission mode has been selected, and turns on all light source units of the light emitter 101 (for the full light emission of the light emitters 101). Herein, the user can set the light amount of the light emitter 101 in the simultaneous light emission by an unillustrated information inputter in the illumination apparatus 100. The preliminary imaging (pre-imaging) may be performed and the light emission amount can be automatically set according to the pre-imaging result. Since the simultaneous light emission mode is a normal strobe photography, the main purpose of the illumination apparatus 100 is to secure a sufficient light emission amount by causing all light source units to emit the light.

In the step S104, when the release button of the imaging apparatus 200 is pressed, the system controller 206 transmits an imaging signal to the illumination device 100 via the connector 102.

In the step S105, the system controller 206 instructs the light emission controller 103 to cause the light emitter 101 to fully emit the light in synchronization with the image signal transmitted in the step S104. At the same time, the system controller 206 drives and controls the imaging optical system 201 and the image sensor 202 to perform simultaneous light emission imaging. The system controller 206 causes the image recorder 209 to store the acquired image as well as causing the imaging controller 207 to acquire an image in synchronization with the imaging signal. Thereby, the simultaneous light emission imaging flow is completed.

In the step S106, the system controller 206 transmits to the light emission controller 103 information indicating that the sequential light emission mode is set, and instructs the light emission controller 103 to provide a control setting so as to sequentially turn on the light source units in the light emitter 101 (or to make the light emitter 101 emit the light individually). Herein, the light amount of the light emitter 101 in the sequential light emission can be set by the user by the unilluminated information inputter in the illumination apparatus 100. The pre-imaging may be performed and the light emission amount may be automatically set according to the pre-imaging result. Since the sequential light emission mode is used for the photometric stereo photography, the light emission amounts of all the light source units may be set to be substantially equal. In the photometric stereo photography, the main purpose of the illumination apparatus 100 is to cause the light source units having the same light emission amount and different light emission positions to sequentially emit the lights in synchronization with a continuous imaging signal of the imaging apparatus 200.

In the step S107, the system controller 206 sets the number of captures (or shots) necessary for the photometric stereo photography based on the information on the number of light source units transmitted from the illumination information acquirer 104. In setting the number of captures, the system controller 206 may use, as reference information, information on the imaging condition of the imaging apparatus 200 such as the number of recording pixels acquired by the imaging condition information acquirer 210 and the shutter speed. There are eight light source units in this embodiment, and thus so the system controller 206 sets the number of captured images to eight. While the conventional camera (imaging apparatus) can continue to consecutively capture images while the release button is being pressed or can set only a specific number of continuous captures such as 5 or 10 captures, this setting results in the redundant number of captures. This embodiment can limit the number of redundantly captured images by setting the number of captured images based on the number of individually light-emittable light sources, and can reduce a storage capacity necessary for a storage medium such as the image recorder 209.

In the step S108, when the release button of the imaging apparatus 200 is pressed, the system controller 206 continuously transmits at least three imaging signals to the illumination apparatus 100 via the connector 102.

In the step S109, the system controller 206 causes the light emission controller 103 to individually emit the light from the light emitter 101 in synchronization with the one imaging signal transmitted in the step S108. At the same time, the system controller 206 drives and controls the imaging optical system 201 and the image sensor 202 so as to perform the individual light emission imaging. The system controller 206 causes the imaging controller 207 to acquire an image in synchronization with the imaging signal. This embodiment performs the light emission and imaging in synchronization with the imaging signal, but when the illumination apparatus 100 and the imaging apparatus 200 communicate with each other, the light emission and imaging may be performed in association with the imaging. For example, the light emission and imaging may be performed in synchronization with the light emission signal.

Figure 5:
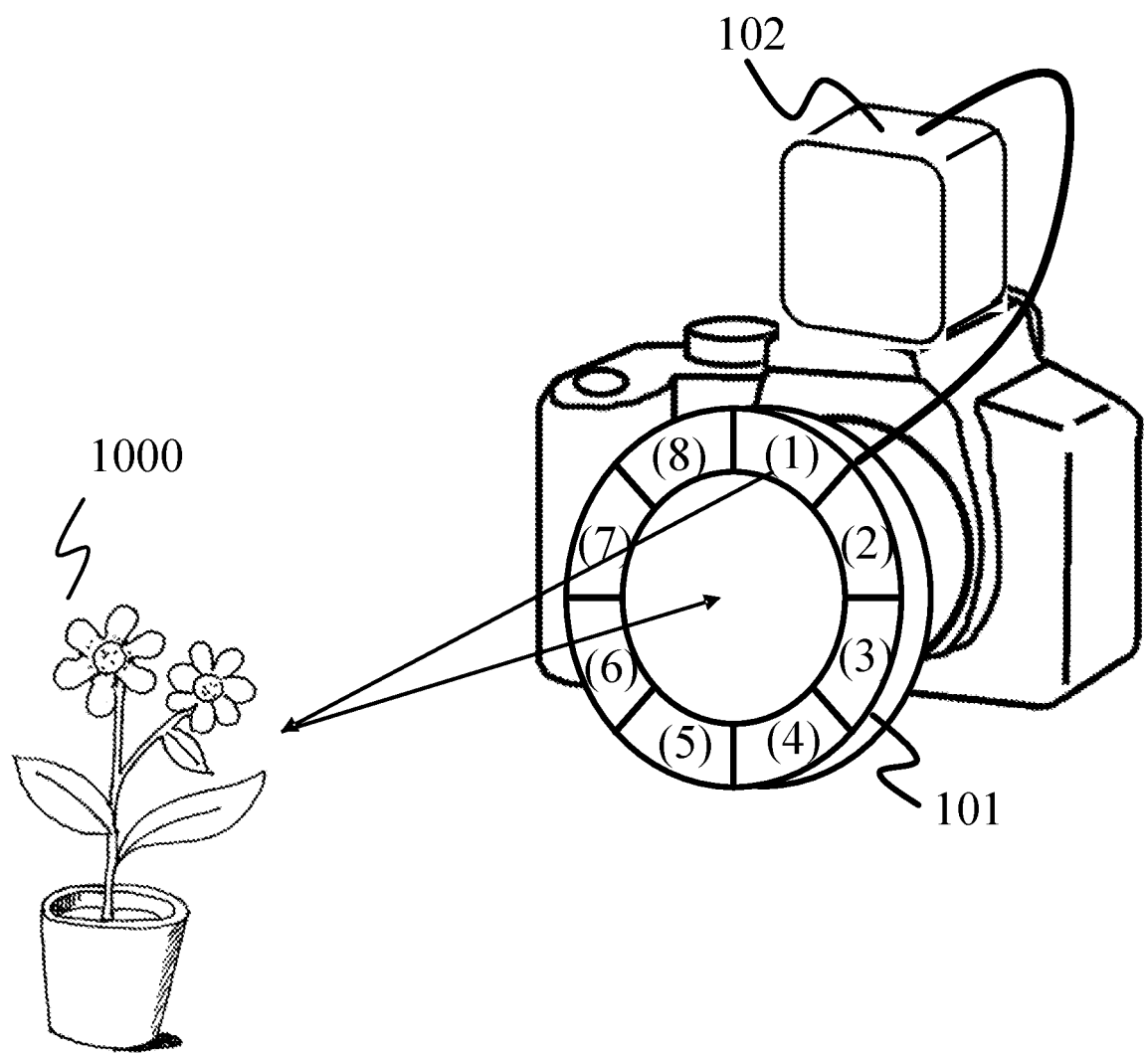
FIG. 5 is an explanatory diagram of the photometric stereo photography according to the first embodiment.

FIG. 5 is an explanatory view of the photometric stereo imaging. The photometric stereo imaging needs a plurality of image captures using light source units having different light emission positions. In this embodiment, as illustrated in FIG. 5, the light source units (1) to (8) emit lights sequentially in numerical order to an object 1000. Totally eight images are acquired by the imaging on the imaging apparatus 200 side in synchronizing with the light emission of each light source. This embodiment instructs the light source unit to emit the light sequentially in order of (1) to (8), but the present invention is not limited to this embodiment. The light source units may emit the lights sequentially in order of (8) to (1), or may emit the lights at random. Each light source unit may include a plurality of light sources, and may include a plurality of solid-state light emitting elements, such as LED light sources, in order to secure the light emission amount. The LED light source as the light source can improve the light emission efficiency for the power amount. Each light source unit, when including a plurality of light sources, may include a light guide, such as a Fresnel lens. Each light source unit can be regarded as one light source unit because the light fluxes from the plurality of light sources can be combined and guided to the object side even when the plurality of light sources are provided. When each light source unit includes the light guide, the light guide may be physically separated for each light source in order to ensure the independence of each light source. When the light guides are not separated, the light leaks to the adjacent light source unit, which results in a calculation error in calculating the surface normal by the photometric stereo method. In order to separate the light guides, a light shielding wall may be provided for each light source unit, or the light guides may be disposed with sufficient distances between them.

In the step S110, the system controller 206 determines whether the imaging of the number of captures set in the step S107 is completed. If the imaging of the number of captures has been completed, the flow proceeds to the step S111, and if the imaging of the number of captures has not yet been completed, the flow returns to the step S108.

In the step S111, the system controller 206 causes the surface normal acquirer 204a to acquirer the surface normal information based on the plurality of captured images. The surface normal acquirer 204a acquires the surface normal information using the above photometric stereo method. The image recorder 209 stores the surface normal information and image information. Thereby, the individual imaging flow ends.

The image recorder 209 may store information obtained by adding the information of the light emission amount and the information of the imaging condition to the image information. By adding the information of the light emission amount and the information of the imaging condition to the image information and by storing it, the correction processing of the luminance information and the acquisition processing of the surface normal may be performed later.

The imaging apparatus 200 may further include a renderer that generates a rendered image based on the surface normal information. The renderer may be provided in an image processing apparatus different from the imaging apparatus 200.

As described above, the configuration according to this embodiment serves to switch between the simultaneous light emission mode and the sequential light emission mode based on the light emission mode set by the imaging apparatus 200. Therefore, this embodiment can achieve both the normal strobe photography that requires a large light emission amount and the photometric stereo photography that requires a plurality of images to be captured at different light source positions.

SECOND EMBODIMENT

Figure 6:
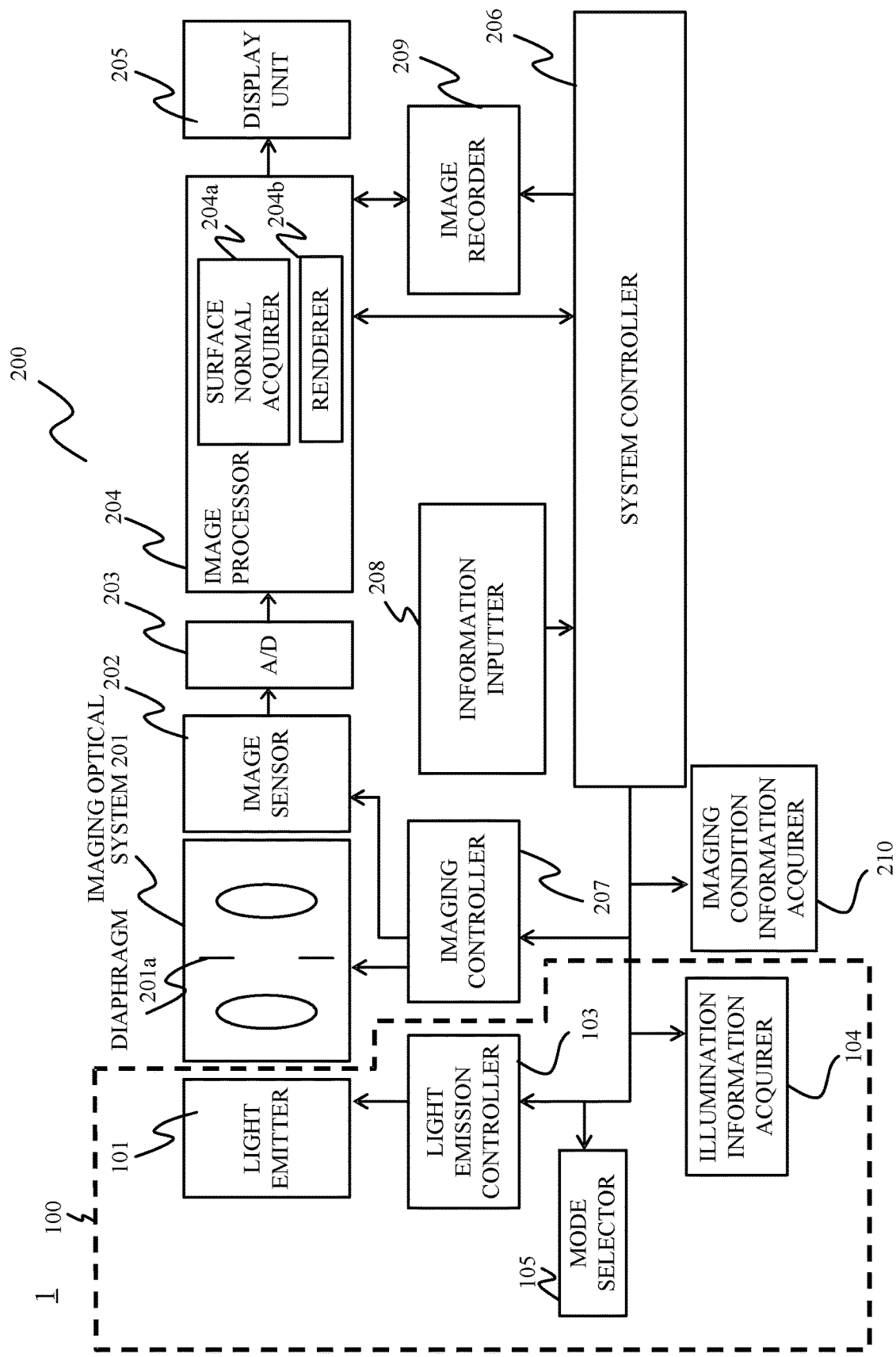
FIG. 6 is a block diagram of an imaging system according to a second embodiment.

FIG. 6 is a block diagram of the imaging system 1 according to this embodiment. Similar to the first embodiment, the imaging system 1 according to this embodiment includes the illumination apparatus 100 and the imaging apparatus 200 to which the illumination apparatus 100 is detachably attached. The overview configuration of the imaging system 1 according to this embodiment is the same as that of the first embodiment, and thus a detailed description thereof will be omitted. The internal configuration of the imaging system 1 according to this embodiment is different from that of the first embodiment in that the illumination apparatus 100 includes a mode selector 105 instead of the mode selector 208a provided in the imaging apparatus 200 and the image processor 204 includes a renderer 204b. The other internal configuration is the same as that of the first embodiment. This embodiment omits a detailed description of the same internal configuration as that of the first embodiment, and discusses only part different from the imaging system 1 of the first embodiment.

The mode selector 105 supplies the light emission controller 103 with a light emission (imaging) mode, such as the simultaneous light emission mode, the sequential light emission mode, and another light emission mode, selected by the user. The renderer 204b generates a rendered image under an arbitrary light source.

Figure 7:
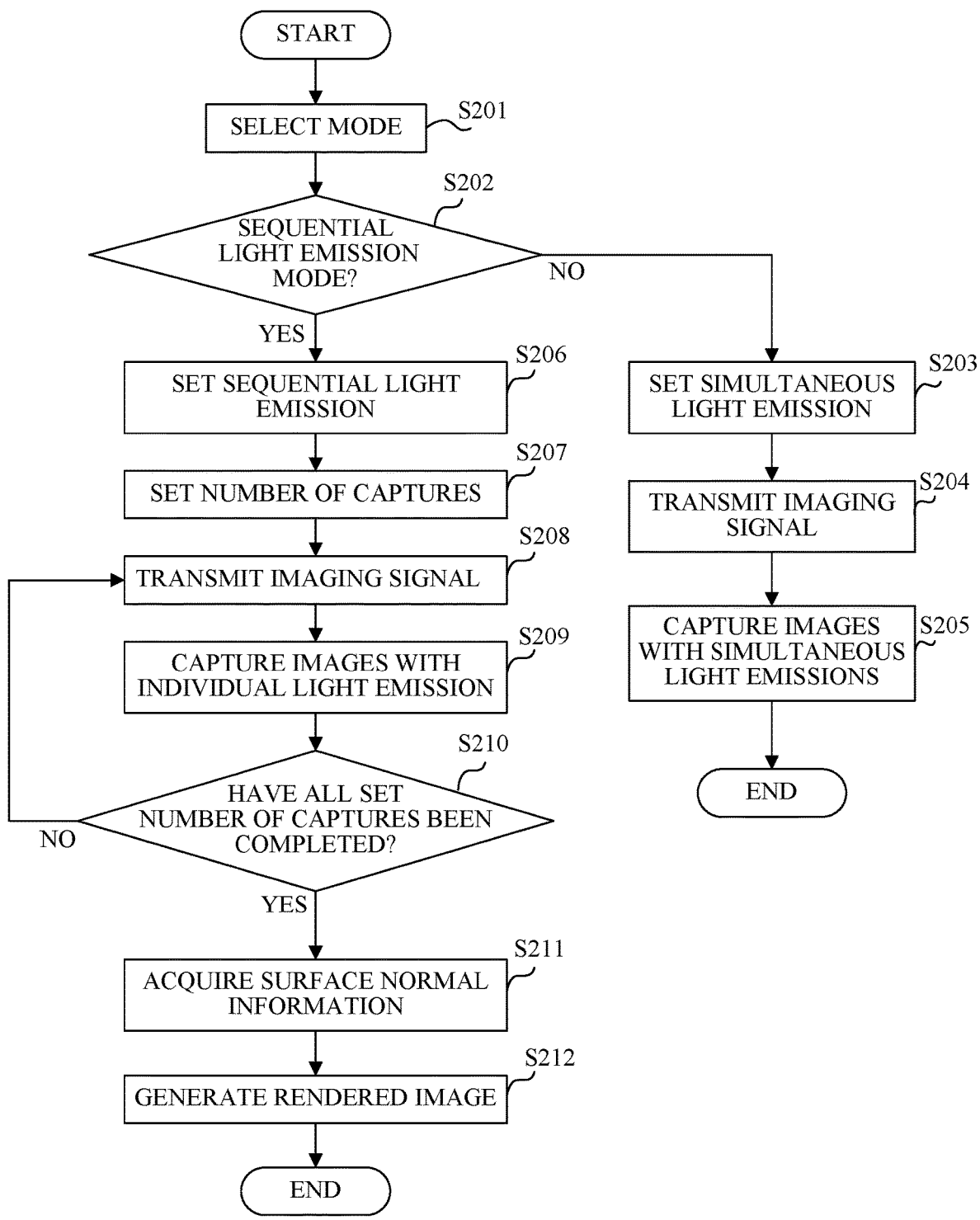
FIG. 7 is a flowchart of imaging processing according to the second embodiment.

FIG. 7 is a flowchart of a light emission control and imaging processing according to this embodiment. The processing in FIG. 7 is executed by the system controller 206 and the light emission controller 103 in accordance with a processing program as a computer program. The processing program may be recorded, for example, in a computer-readable storage medium.

In the step S201, the system controller 206 and the light emission controller 103 acquire the light emission mode selected by the user through the mode selector 105. In this embodiment, the user can select, as the light emission mode, either the simultaneous light emission mode that means the normal strobe photography or the sequential light emission mode that means the photometric stereo photography, but the present invention is limited to this embodiment. In addition to these modes, another light emission mode can be selected which realizes another light emission state.

In the step S202, the system controller 206 and the light emission controller 103 determine the selected light emission mode. In this embodiment, the system controller 206 and the light emission controller 103 determine whether the selected light emission mode is the sequential light emission mode. If the light emission mode is the sequential light emission mode, the flow proceeds to the step S206, and if the light emission mode is not the sequential light emission mode or if the light emission mode is the simultaneous light emission mode, the flow proceeds to the step S203.

In the step S203, the light emission controller 103 provides a control setting to turn on all the light source units in the light emitters 101. The system controller 206 sets, via the imaging controller 207, an imaging control for a single capture according to the simultaneous light emission.

Herein, the user can set the light amount of the light emitter 101 in the simultaneous light emission by the unillustrated information inputter in the illumination apparatus 100. The pre-imaging may be performed and the light emission amount may be automatically set according to the pre-imaging result. Since the simultaneous light emission mode is used for the normal strobe photography, the main purpose of the illumination apparatus 100 is to secure a sufficient light emission amount by causing the light emitter to wholly emit the lights.

In the step S204, when the release button of the imaging apparatus 200 is pressed, the system controller 206 transmits an imaging signal to the illumination apparatus 100 via the connector 102. In this embodiment, the imaging apparatus 200 transmits the imaging signal to the illumination apparatus 100, but the illumination apparatus 100 may transmit the imaging signal to the imaging apparatus 200 via the connector 102.

In the step S205, the light emission controller 103 causes the light emitter 101 to fully emit the light in synchronization with the imaging signal transmitted in the step S204. At the same time, the system controller 206 drives and controls the imaging optical system 201 and the image sensor 202 to perform the simultaneous light emission imaging. The system controller 206 causes the image recorder 209 to store the acquired image as well as causing the imaging controller 207 to acquire an image in synchronization with the imaging signal. Thereby, the simultaneous light emission imaging flow is completed.

In the step S206, the light emission controller 103 performs the control setting to sequentially turn on the light source units in the light emitter 101. In addition, the system controller 206 performs the imaging control setting of continuous imaging (consecutive imaging function) according to the sequential light emission via the imaging controller 207. Herein, the light amount of the light emitter 101 in the light emission can be set by the user through the unillustrated information inputter in the illumination apparatus 100. The pre-imaging may be performed and the light emission amount may be automatically set according to the pre-imaging result. Since the sequential light emission mode is used for the photometric stereo photography, the light emission amounts of all light source units may be set substantially equal. In the photometric stereo photography, the main purpose of the illumination apparatus 100 is to cause the light source units having the same light emission amount and different light emission positions to sequentially emit the lights in synchronization with the continuous imaging signal of the imaging apparatus 200.

In the step S207, the system controller 206 sets the number of captures necessary for the photometric stereo photography based on the information on the number of light source units transmitted from the illumination information acquirer 104. In setting the number of captures, the system controller 206 may use, as reference information, information on the imaging condition of the imaging apparatus 200 such as the number of recording pixels acquired by the imaging condition information acquirer 210 and the shutter speed. This embodiment can limit the number of redundantly captured images by setting the number of captured images based on the number of individually light-emittable light sources, and can reduce the storage capacity necessary for a storage medium, such as the image recorder 209.

In the step S208, when the release button of the imaging apparatus 200 is pressed, the system controller 206 continuously transmits imaging signals to the illumination apparatus 100 via the connector 102.

In the step S209, the system controller 206 causes the light emission controller 103 to individually emit the light from the light emitter 101 in synchronization with the one imaging signal transmitted in the step S208. At the same time, the system controller 206 drives and controls the imaging optical system 201 and the image sensor 202 so as to perform the individual light emission photography. The system controller 206 causes the imaging controller 207 to acquire an image in synchronization with the imaging signal. This embodiment performs the light emission and imaging in synchronization with the imaging signal, but when the illumination apparatus 100 and the imaging apparatus 200 communicate with each other, the light emission and imaging may be performed in association with the imaging. For example, the light emission and imaging may be performed in synchronization with the light emission signal.

In the step S210, the system controller 206 determines whether the imaging of the number of captures set in the step S207 has been completed. If the imaging of the number of captures has been completed, the flow proceeds to the step S211, and if the imaging of the number of captures has not yet been completed, the flow returns to the step S208.

In the step S211, the system controller 206 causes the surface normal acquirer 204a to acquirer the surface normal information based on a plurality of captured images. The surface normal acquirer 204a acquires the surface normal information using the above photometric stereo method. The image recorder 209 stores the surface normal information and the image information.

The image recorder 209 may store the information obtained by adding the information of the light emission amount and the information of the imaging condition to the image information. By adding the information of the light emission amount and the information of the imaging condition to the image information and by storing it, the correction processing of the luminance information and the acquisition processing of the surface normal may be performed later.

In the step S212, the system controller 206 causes the renderer 204b to generate a rendered image under an arbitrary light source condition based on the surface normal information calculated in the step S211. For example, a rendered image can be generated under the light source condition, such as a light source position, the light source intensity, and the light source color, selected by the user in the information inputter 208. The image recorder 209 stores the rendered image, and the individual imaging flow ends.

As described above, the configuration according to this embodiment serves to switch between the simultaneous light emission mode and the sequential light emission mode based on the light emission mode set by the illumination apparatus 100. Therefore, this embodiment can achieve both the normal strobe photography that requires a large light emission amount and the photometric stereo photography that requires the plurality of images to be captured at different light source positions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-129102, filed on Jul. 6, 2018, which is hereby incorporated by reference herein in its entirety.

What is claimed is:

1. A control apparatus comprising a controller configured to control a light emission of at least three light source units having different light emission positions provided in an accessory that is configured to communicate with an imaging apparatus,
    wherein the controller switches a simultaneous light emission mode that causes all of the at least three light source units to emit lights and a sequential light emission mode that causes the at least three light source units to sequentially emit the lights in association with imaging,
    wherein the controller causes the at least three light source units to sequentially emit the lights in synchronization with each of at least three imaging signals transmitted from the imaging apparatus in the sequential light emission mode such that (i) a first light source among the at least three light sources emits first light in synchronization with a first imaging signal of the at least three imaging signals so that a first image is captured while the first light source emits the first light, (ii) a second light source among the at least three light sources emits second light in synchronization with a second imaging signal of the at least three imaging signals so that a second image is captured while the second light source emits the second light, and (iii) a third light source among the at least three light sources emits third light in synchronization with a third imaging signal of the at least three imaging signals so that a third image is captured while the third light source emits the third light,
    wherein the controller is configured to switch between the simultaneous light emission mode and the sequential light emission mode based on information from a selector provided in at least one of the imaging apparatus and the accessory and configured to select the simultaneous light emission mode and the sequential light emission mode, and
    wherein at least one processor or circuit is configured to perform a function of the controller.

2. The control apparatus according to claim 1, further comprising an illumination information acquirer configured to transmit information on the accessory to the imaging apparatus.

3. The control apparatus according to claim 2, wherein the information on the accessory includes information that causes the imaging apparatus to identify at least one of a number of the at least three light source units, a light emission amount of one or more of the at least three light source units, and a color temperature of one or more of the at least three light source units.

4. The control apparatus according to claim 1, wherein the controller causes all of the at least three light source units to sequentially emit the lights in the sequential light emission mode.

5. An accessory configured to communicate with an imaging apparatus, the accessory comprising at least three light source units having different light emission positions, and a controller configured to control a light emission of the at least three light source units,
    wherein the controller switches a simultaneous light emission mode that causes all of the at least three light source units to emit lights and a sequential light emission mode that causes the at least three light source units to sequentially emit the lights in association with imaging,
    wherein the controller causes the at least three light source units to sequentially emit the lights in synchronization with each of at least three imaging signals transmitted from the imaging apparatus in the sequential light emission mode such that (i) a first light source among the at least three light sources emits first light in synchronization with a first imaging signal of the at least three imaging signals so that a first image is captured while the first light source emits the first light, (ii) a second light source among the at least three light sources emits second light in synchronization with a second imaging signal of the at least three imaging signals so that a second image is captured while the second light source emits the second light, and (iii) a third light source among the at least three light sources emits third light in synchronization with a third imaging signal of the at least three imaging signals so that a third image is captured while the third light source emits the third light,
    wherein the controller is configured to switch between the simultaneous light emission mode and the sequential light emission mode based on information from a selector provided in at least one of the imaging apparatus and the accessory and configured to select the simultaneous light emission mode and the sequential light emission mode, and
    wherein at least one processor or circuit is configured to perform a function of the controller.

6. The accessory according to claim 5, wherein each of the at least three light source units includes a solid-state light emitting element.

7. The accessory according to claim 5, further comprising light guides configured to guide the lights emitted from the at least three light source units to an object side, and separated for each light source unit.

8. The accessory according to claim 5, wherein the accessory comprises four to eight light source units inclusive.

9. An imaging apparatus configured to communicate with an accessory comprising at least three light source units having different light emission positions, the imaging apparatus comprising a controller configured to control a light emission of the at least three light source units,
   wherein the controller switches a simultaneous light emission mode that causes all of the at least three light source units to emit lights and a sequential light emission mode that causes the at least three light source units to sequentially emit the lights in association with imaging,
   wherein the controller causes the at least three light source units to sequentially emit the lights in synchronization with each of at least three imaging signals transmitted from the imaging apparatus in the sequential light emission mode such that (i) a first light source among the at least three light sources emits first light in synchronization with a first imaging signal of the at least three imaging signals so that a first image is captured while the first light source emits the first light, (ii) a second light source among the at least three light sources emits second light in synchronization with a second imaging signal of the at least three imaging signals so that a second image is captured while the second light source emits the second light, and (iii) a third light source among the at least three light sources emits third light in synchronization with a third imaging signal of the at least three imaging signals so that a third image is captured while the third light source emits the third light,
   wherein the controller is configured to switch between the simultaneous light emission mode and the sequential light emission mode based on information from a selector provided in at least one of the imaging apparatus and the accessory and configured to select the simultaneous light emission mode and the sequential light emission mode, and
   wherein at least one processor or circuit is configured to perform a function of the controller.

10. The imaging apparatus according to claim 9, wherein the controller sets a number of captures in the sequential light emission mode based on information on the accessory, and acquires a plurality of captured images according to the set number of captures.

11. The imaging apparatus according to claim 9, further comprising a surface normal acquirer configured to acquire surface normal information based on a plurality of captured images.

12. The imaging apparatus according to claim 11, further comprising a renderer configured to generate a rendered image based on the surface normal information.

13. An imaging system comprising:
   an accessory including at least three light source units having different light emission positions;
   an imaging apparatus configured to communicate with the accessory; and
   the controller according to claim 1.

* * * * *